United States Patent

Colom

[11] Patent Number: 6,082,425
[45] Date of Patent: Jul. 4, 2000

[54] CROWN REINFORCEMENT FOR A HEAVY VEHICLE TIRE

[75] Inventor: André Colom, Chamaliéres, France

[73] Assignee: Compagnie Generale des Etalissements Michelin - Michelin & Cie, Clermont-Ferrand Cedex, France

[21] Appl. No.: 09/125,473

[22] PCT Filed: Feb. 11, 1997

[86] PCT No.: PCT/EP97/00620

§ 371 Date: Aug. 19, 1998

§ 102(e) Date: Aug. 19, 1998

[87] PCT Pub. No.: WO97/30856

PCT Pub. Date: Aug. 28, 1997

[30] Foreign Application Priority Data

Feb. 20, 1996 [FR] France .................................. 96/02177

[51] Int. Cl.[7] ................ B60C 3/04; B60C 9/18; B60C 9/20; B60C 9/22
[52] U.S. Cl. ............ 152/454; 152/526; 152/527; 152/531; 152/532; 152/534
[58] Field of Search .................. 152/526, 527, 152/531, 532, 534, 538, 454, 533

[56] References Cited

U.S. PATENT DOCUMENTS

| | | | |
|---|---|---|---|
| 3,667,527 | 6/1972 | Magistrini et al. | 152/531 X |
| 3,703,202 | 11/1972 | Maiocchi . | |
| 4,526,217 | 7/1985 | Maeda et al. . | |
| 4,688,615 | 8/1987 | Lee . | |
| 5,738,740 | 4/1998 | Cluzel . | |

FOREIGN PATENT DOCUMENTS

| | | |
|---|---|---|
| 5069702 | 3/1993 | Japan . |
| WO9620095 | 7/1996 | WIPO . |

*Primary Examiner*—Adrienne C. Johnstone
*Attorney, Agent, or Firm*—Baker Botts, L.L.P.

[57] ABSTRACT

A tire having an Heterologous/S form ratio of at least 0.50, having a radial carcass reinforcement (1) and crown reinforcement (3) composed of at least two working crown plies (31,33) made of inextensible metal cables, crossed from one ply to the next, forming angles of between 10° and 45° with the circumferentail direction, and of an additional ply (32) which is axially continuous and formed of metallic elements oriented substantially parallel circumferential direction. Said ply (32) over the working ply (31) radially closest carcass reinforcement (1,) and the ratio of its rigidity of extension per unit of width to the total of the rigidities of extension of the other plies of the crown reinforcement being between 0.35 and 0.70.

5 Claims, 1 Drawing Sheet

CROWN REINFORCEMENT FOR A HEAVY VEHICLE TIRE

BACKGROUND OF THE INVENTION

The invention relates to a tire with radial carcass reinforcement anchored in each bead to at least one bead wire, and comprising a crown reinforcement formed by at least two so-called working plies, superposed and formed of reinforcing elements which are parallel to each other in each ply and are crossed from one ply to the next, forming angles of at most 40° in absolute value with the circumferential direction of the tire.

U.S. Pat. No. 4,688,615 describes a crown reinforcement for a radial tire composed of a first ply and of a second ply formed by cables parallel to each other in each ply, crossed from one ply to the next, forming an angle with the circumferential direction of the tire that can range between 5 and 60°. A third ply of circumferentially arranged cables is placed between said two plies, those cables having a diameter at most equal to the diameter of the cables of the first and second plies, and being made of a material having a tensile strength less than the tensile strength of the material forming the cables of the first and second plies, which imparts a lesser tensile strength to said third ply, and being more extensible than each of the plies with crossed cables, said third ply being no wider than the ply of cords with the widest angle.

French Application FR 94/15,736, corresponding to U.S. Pat. No. 5,738,740 relates to a tire as described above, and more particularly to a heavy vehicle tire, the ratio of the height above rim H to the maximum axial width S of which is at most 0.60. Said application, in order to improve the life of the crown reinforcement of such a tire, and also the regularity of wear of the tread thereof, requires an architecture of the crown reinforcement characterized by the combined presence in said reinforcement of an axially continuous ply formed of inextensible metal reinforcing elements forming an angle of at least 60° with the circumferential direction of the tire, and a ply of metallic elements oriented substantially parallel to the circumferential direction, arranged radially between the two working crown plies.

Such an architecture makes it possible to obtain better resistance to separation between working plies, and also better fatigue strength of the cables of the carcass reinforcement located beneath the crown reinforcement thus formed. The axial width of the additional ply of circumferential reinforcing elements may be less than the widths of the working plies.

Since the operating temperatures in the tires of form ratio of at least 0.50 are not negligible, Applicant's research has led him to look for a solution which is more effective from the thermic and economic points of view.

In order to improve the life of the crown reinforcement and subjacent carcass reinforcement of a tire, without using a crown ply formed by metal cables very greatly inclined relative to the circumferential direction of the tire and located radially above the carcass reinforcement, the present invention proposes a more economic solution than that described in the above French application.

The tire having an H/S form ratio of at least 0.50, according to the invention, comprises a radial carcass reinforcement and a crown reinforcement composed of at least two working crown plies made of inextensible metal cables, crossed from one ply to the next, forming angles of between 10° and 45° with the circumferential direction, of a protective crown ply formed of elastic metallic cables made of steel oriented relative to the circumferential direction at an angle of the same direction as the angle formed by the cables of the radially outermost working crown ply, and of an additional ply which is axially continuous and formed of metallic reinforcing elements made of steel oriented substantially parallel to the circumferential direction, the additional ply being arranged above the radially closest working ply to the carcass reinforcement, the presence of a crown ply formed of metallic elements oriented relative to the circumferential direction by an angle greater than 45° being excluded, and is characterized in that the axial width of the protective ply is greater than the axial width of the additional ply of metallic element made of steel, while remaining less than the axial width of the radially outermost working ply, and in that the ratio of the rigidity $R=(1/p)(dF/d\epsilon)$ of extension per unit of width of the additional ply to the sum of the rigidities of all the other plies of the crown reinforcement ranges between 0.35 and 0.70, p being the pitch between the cables or reinforcing elements of the ply, F being the tensile force per cable or element, and $\epsilon$ the relative elongation equal to 0.5%.

Advantageously, from both the technical and the economic point of view, the value of this ratio will be obtained by using in the so-called additional ply metallic elements made of steel of a larger diameter than that of the metal cables made of steel forming the working plies.

"Inextensible cable" is to be understood to mean a cable, for instance a steel cable, which has a relative elongation of less than 0.5% measured at 25% of its breaking load.

Metallic elements oriented substantially parallel to the circumferential direction are elements which form angles within the range of +2.5° to −2.5° or around 0° with said direction.

The rigidity of extension of a ply of reinforcing elements results from the tensile force exerted in the direction of the cables per unit of width of ply which is necessary to obtain a given relative elongation $\epsilon$, and may be expressed by the formula $R=dF/d\epsilon$, R being the rigidity of the ply in question and $dF/d\epsilon$ the derivative of the tensile force per unit of width of the ply in relation to the relative elongation, or by the formula $$R = \frac{1}{p}\frac{dF}{d\epsilon}$$

p being the pitch between the elements of said ply, and $dF/d\epsilon$ the derivative of the tensile force per element in relation to the relative elongation.

In the above context, the additional ply may be formed of so-called semi-elastic continuous steel cables, that is to say cables having relative elongations upon rupture of between 2% and 6%. These cables make it possible to obtain the level of rigidity suitable for proper distribution of the circumferential tension between the working crown plies and the additional ply. Said cables are advantageously said to be "bimodular", that is to say, having a curve of tensile stress as a function of relative elongation having gradual slopes for the low elongations and a substantially constant, steep slope for the higher elongations. The very low modulus before curing for elongations of less than 2% permits an increase in the circumferential development of the additional ply during the curing of the tire.

The additional ply may also be formed of metal cables made of steel, oriented circumferentially and cut so as to form sections of a length very much less than the circumferential length of the ply, the cuts between sections being axially circumferentially offset relative to each other. Such an embodiment makes it possible, in simple manner, to impart to the additional ply the desired rigidity, whatever it may be.

DESCRIPTION OF THE DRAWING

The characteristics and advantages of the invention will be better understood with reference to the following description, which refers to the drawing, illustrating in non-limitative manner an example of embodiment, and in which the single

DESCRIPTION OF PREFERRED EMBODIMENTS

Figure 1:
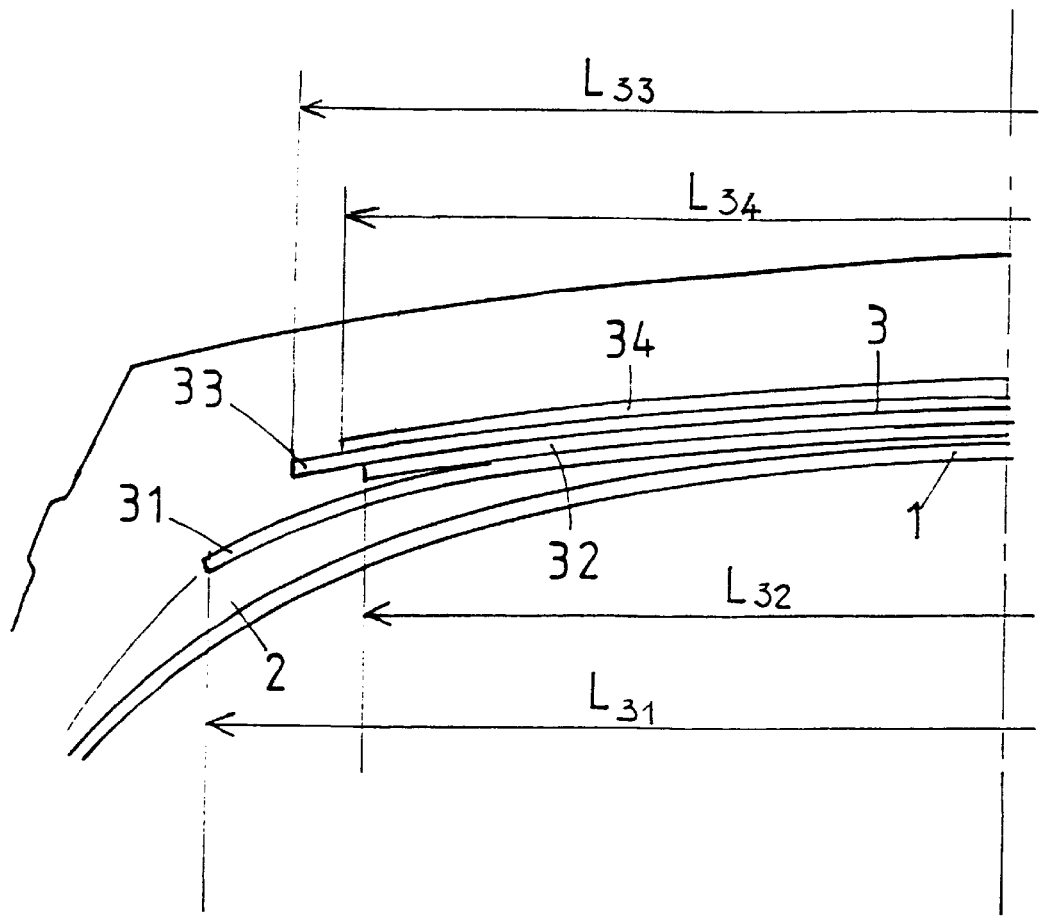
FIG. 1 shows a diagram, viewed in meridian section, of a crown reinforcement according to the invention.

The tire P, of dimension 315/80 R 22.5, has an H/S form ratio of 0.8, H being the height of the tire P on its mounting rim and S its maximum axial width. Said tire P comprises a radial carcass reinforcement 1 formed by a single ply of metal cables made of steel, anchored in each bead to at least one bead wire, forming an upturn. The carcass reinforcement 1 is hooped by a crown reinforcement 3, formed radially from the inside to the outside by a first working crown ply 31 formed of inextensible metal cables made of steel and oriented by an angle $\alpha$ of 22°, and the central part of which is parallel to the carcass reinforcement 1, the cables respectively of the carcass ply and of the working ply being separated only by the calendering thicknesses, the lateral parts being separated from the carcass reinforcement by rubber profiled elements 2 so as to impart a slight curvature to said ply;

radially surmounting the first working ply 31, by an additional ply 32 formed of inextensible metallic elements made of steel, each element having a circumferential length substantially equal to ⅙ of the circumferential length of the ply 32, and said elements being oriented at 0°;

then by a second working crown ply 33 formed of metal cables identical to those of the first ply 31, and forming an angle $\beta$, opposed to the angle $\alpha$ and, in the case illustrated, equal to said angle $\alpha$ of 22° (but possibly being different from said angle $\alpha$), with the circumferential direction;

and finally by a final ply 34 of so-called elastic steel cables, oriented relative to the circumferential direction by an angle $\theta$ of the same direction as the angle $\beta$ and equal to said angle $\beta$ (but possibly being different), this last ply being a so-called protective ply, and so-called elastic cables being cables having a relative elongation of at least 4% upon rupture.

The axial width $L_{31}$ of the first working ply is equal to 226 mm, which, for the tire in question, is substantially equal to the width of the tread and is equal in the case in question to 235 mm. The axial width $L_{33}$ of the second working ply 33 is less than the width $L_{31}$ of the first working ply 31 and equal to 204 mm. The axial width $L_{32}$ of the additional ply 32 is equal to 160 mm. The final crown ply 34, referred to as a protective ply, has a width $L_{34}$ which is very slightly greater than the width $L_{32}$ of the additional ply, namely, 170 mm.

The rigidity of extension per unit of width of the working ply 31 or of the working ply 33, identical in the present case, since they are formed of the same non-hooped 9.28 metal cables made of steel, of a diameter of 1.09 mm, which are in extensible and continuous over the entire width of the ply, said cables being arranged with the same pitch of 1.8 mm, is greater than 4000 daN/mm at 0.5% relative elongation, and in the case in question equal to 5500 daN/mm. The rigidity of the same name and measured under the same conditions of the additional ply 32, formed of non-hooped 27.23 metal cables made of steel, and of a diameter of 1.4 mm, and cut so as to have sections of cables the circumferential length of which is substantially equal to 20% of the circumferential length of the ply, the rows of elements being separated from each other by a pitch of 2 mm, is then equal to 5500 daN/Memorandum for the relative elongation of 0.5%.

The tire described above was tested, firstly on a test drum, under conditions simulating travel on a vehicle under a load of 4000 kg for an inflation pressure of 8.5 bar and at a drift angle of 5° and at a speed of 80 km/h, and secondly on a test vehicle under a load greater than 4500 kg for an inflation pressure of 8.5 bar, at an average speed of 105 km/h, the vehicle being able to be considered as travelling in a straight line. The measurements of temperature, in the tests on the vehicle, taken at the ends of the working crown plies show a slight gain in terms of operating temperature, but, on the other hand, a gain of at least 100% in mileage before rupture compared with a tire of conventional architecture, that is to say with a crown reinforcement composed of a ply of greatly inclined cables, of two working plies of cables slightly inclined and crossed from one ply to the next, and a protective ply of elastic cables. The gain in mileage is just as great in the case of travelling on a test drum and at a drift of 5°, since it attains 80%: 7800 km covered by the tire according to the invention, whereas the conventional tire only covered 4430 km.

The additional ply 32 may also be formed of so-called "bimodular" steel cables. Since a certain elasticity of the ply 32 is only useful during the shaping of the tire in the vulcanization mold, a cable having a low modulus, for example of at most 1000 daN/mm², from the origin to 1% relative elongation and a modulus for instance greater than 8000 daN/mm² for a relative elongation of more than 2%, can be used.

I claim:

1. A tire having an H/S form ratio of at least 0.50, comprising a radial carcass reinforcement (1) and a crown reinforcement (3), composed of two working crown plies (31, 33) made of inextensible metal cables, crossed from one ply to the next, forming angles ($\alpha$, $\beta$) of between 10° and 45° with the circumferential direction, of widths $L_{31}$ and $L_{33}$, of a protective crown ply (34), formed of elastic metallic cables made of steel oriented relative to the circumferential direction at an angle ($\theta$) of the same direction as the angle ($\beta$) of the cables of the radially outermost working ply (33), of width $L_{34}$, and of an additional axially continuous ply (32) formed of metallic reinforcing elements made of steel oriented substantially parallel to the circumferential direction, of width $L_{32}$, said additional ply (32) being placed above the radially closest working ply (31) to the carcass reinforcement (1), the presence of a crown ply made of metallic elements forming an angle greater than 45° with the circumferential direction being excluded, the tire characterized in that the axial width $L_{34}$ of the protective ply (34) is greater than the axial width $L_{32}$ of the additional ply (32) of metallic elements made of steel, while remaining less than the axial width $L_{33}$ of the radially outermost working ply (33), and in that the ratio of rigidity $R=(1/p)(dF/d\epsilon)$ of extension per unit width of the additional ply (32) to the sum of the rigidities of all the other plies (31, 33, 34) of the crown reinforcement ranges between 0.35 and 0.7, p being the pitch between the cables or reinforcing elements of the ply, F being the tensile force per cable or element and $\epsilon$ the relative elongation equal to 0.5%.

2. A tire according to claim 1, characterized in that the steel reinforcing elements of the additional ply (32) are of a larger diameter than that of the steel cables of the two working plies (31, 33).

3. A tire according to claim 1, characterized in that the steel reinforcing elements of the additional ply (32) are semi-elastic continuous steel cables, having relative elongations upon rupture of between 2% and 6%, and a curve of tensile stress as a function of relative elongation having gradual slopes for the low elongations and a substantially constant steep slope for the higher elongations.

4. A tire according to claim 3, characterized in that the semi-elastic steel cables have a low modulus, at most equal to 1000 daN/mm$^2$, from the origin to 1% relative elongation and a modulus greater than 8000 daN/mm$^2$ for a relative elongation of more than 2%.

5. A tire according to claim 1, characterized in that the steel reinforcing elements of the additional ply (32) are cables oriented circumferentially and cut so as to form sections of a length very much less than the circumferential length of the ply, the cuts between sections being axially offset relative to each other.

* * * * *

UNITED STATES PATENT AND TRADEMARK OFFICE
CERTIFICATE OF CORRECTION

PATENT NO. : 6,082,425

DATED : July 4, 2000

INVENTOR(S) : Colom

It is certified that error appears in the above-identified patent and that said Letters Patent is hereby corrected as shown below:

On the Cover:

[75] Inventors: "Chamaliéres," should read -- Clermont-Ferrand, --
[73] Assignee: "Generale" should read -- Générale --; and "Etalissements" should read -- Etablissements --
[57] ABSTRACT, line 1: "Heterologuous/S" should read -- H/S --
[57] ABSTRACT, line 6: "circumferentail" should read -- circumferential --
[57] ABSTRACT, line 8: "parallel circumferential" should read -- parallel to the circumferential --
[57] ABSTRACT, lines 9–10: "Said ply (32) over the working ply (31) radially closest carcass reinforcement" should read -- Said ply (32) being placed over the radially closest working ply (31) to the carcass reinforcement --
[57] ABSTRACT, line 10: "(1,)" should read -- (1), --

UNITED STATES PATENT AND TRADEMARK OFFICE
CERTIFICATE OF CORRECTION

PATENT NO. : 6,082,425
DATED : July 4, 2000
INVENTOR(S) : Colom

It is certified that error appears in the above-identified patent and that said Letters Patent is hereby corrected as shown below:

Column 2, line 38: "R=d/F/d ," should read -- R=dF/d , --
Column 3, line 1: "circumferentially" should be deleted
Column 3, line 49: " of" should read --  of --
Column 4, line 1: "in extensible" should read -- inextensible --
Column 4, line 12: "daN/Memorandum" should read -- daN/mm --

Signed and Sealed this

Eighth Day of May, 2001

Attest:

NICHOLAS P. GODICI

Attesting Officer    Acting Director of the United States Patent and Trademark Office